No. 808,506. PATENTED DEC. 26, 1905.
W. BLETSO.
STEAM TRAP.
APPLICATION FILED MAR. 8, 1905.
2 SHEETS—SHEET 1.

WITNESSES:
John J. Kittle
Isaac B. Owens

INVENTOR
William Bletso
BY
ATTORNEYS

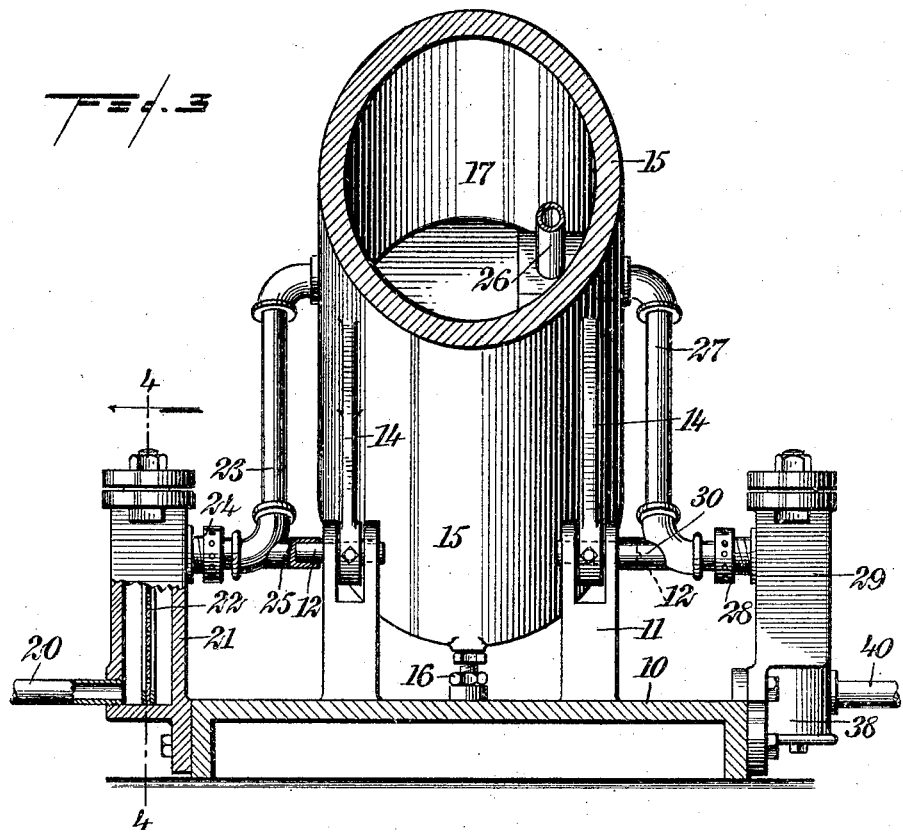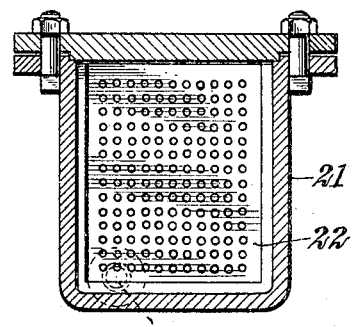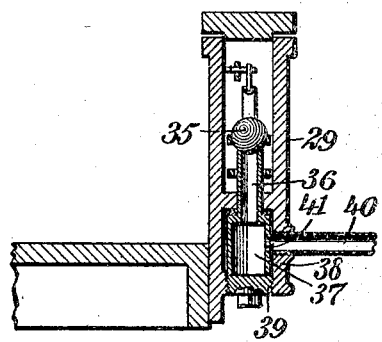

UNITED STATES PATENT OFFICE.

WILLIAM BLETSO, OF YOUNGSTOWN, OHIO.

STEAM-TRAP.

No. 808,506. Specification of Letters Patent. Patented Dec. 26, 1905.

Application filed March 8, 1905. Serial No. 248,965.

*To all whom it may concern:*

Be it known that I, WILLIAM BLETSO, a citizen of the United States, and a resident of Youngstown, in the county of Mahoning and State of Ohio, have invented a new and Improved Steam-Trap, of which the following is a full, clear, and exact description.

The invention relates to a trap of that class in which the steam and water of condensation are entered into a chamber the outlet of which is sealed by a valve and in which when the water attains a certain height in the chamber the valve is opened and the steam-pressure is permitted to discharge the liquid contents of the chamber; and the object of the invention is primarily to improve the general design of the trap and to provide means for effectually and rapidly operating the discharge-valve.

Reference is had to the accompanying drawings, which illustrate as an example the preferred embodiment of my invention, in which drawings like characters of reference indicate like parts in the several views, and in which—

Figure 1:
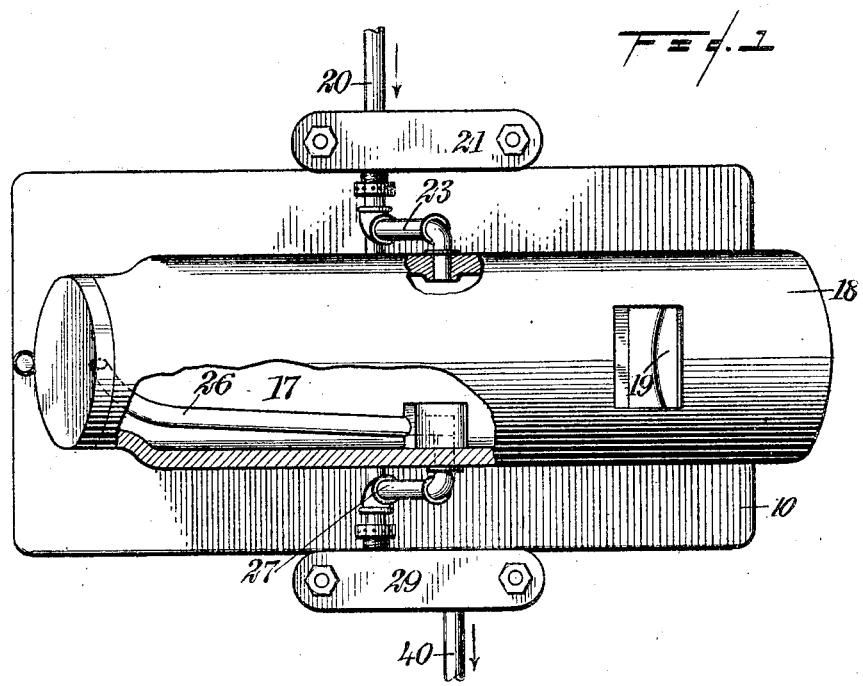
Figure 2:
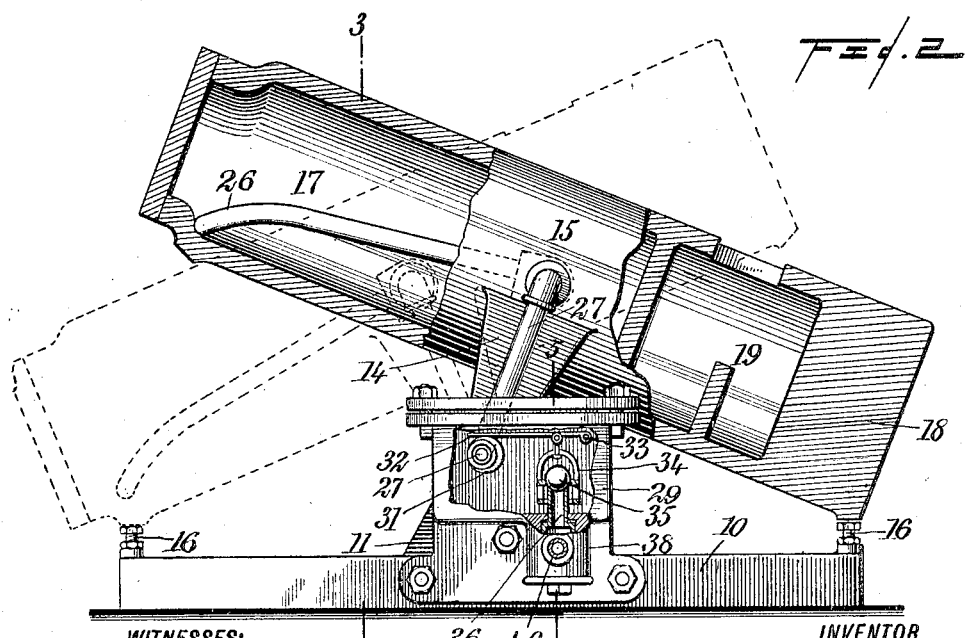

Figure 1 is a plan view of the trap with parts broken away. Fig. 2 is a side elevation thereof with parts broken away to show the interior of the steam and water chamber and also to illustrate the discharge-valve and the manner of operating the same. Fig. 3 is a cross-section on the line 3 3 of Fig. 2. Fig. 4 is a cross-section on the line 4 4 of Fig. 3, and Fig. 5 is a cross-section on the line 5 5 of Fig. 2.

The trap is provided with a suitable base 10, on which are erected pedestals 11, rockably carrying pins 12. These pins are axially coincident to each other and are fastened in brackets 14, depending from an elongated vessel 15. In this manner the vessel 15 is mounted to rock around the axis of the pins 12, this rocking movement being limited by adjustable stop-screws 16, attached to the base and shown best in Figs. 2 and 3. The vessel 15 is provided in one end portion with a steam and water chamber 17. The other end of the vessel is weighted, as indicated at 18, and adjacent to this weighted portion it is formed with a chamber 19, adapted to receive weights. With this arrangement, therefore, the vessel 15 normally assumes the position shown in Fig. 2. When, however, the predetermined quantity of water accumulates in the chamber 17, the vessel will cant around the center of the pins 12 to the position shown by broken lines in Fig. 2.

20 indicates a connection with the source of steam and water of condensation, which passes into a box 21, located at one side of the trap and fastened to the bed, as shown. In the box 21 is a strainer 22, and passing from the side of the box opposite the side connecting with the pipe 20 is a pipe connection 23, the arrangement being such that the water and steam from the pipe 20 must pass through the strainer 22 before entering the pipe 23.

24 indicates a suitable stuffing-box in which the end of the pipe 23 is fitted, said end of the pipe being coincident to the axis of the pins 12, so that the pipe may rock with the vessel 15 around the center of said pins. The pipe connection 23 is also formed with a socket 25, which loosely receives the projecting outer end of the adjacent pin 12, thus holding the pipe connection in place and permitting it to rock freely, as explained. Said pipe connection passes into the chamber 17 to deliver thereto the steam and water of condensation.

26 indicates the water-outlet pipe, which is located in the chamber 17 and connects with a pipe 27 outside of the chamber opposite the pipe 23. The pipe 27 passes downwardly and has its end fitted loosely in a suitable stuffing-box 28, mounted on the valve-box 29. The pipe 27 also has a socket-piece 30, which loosely receives the projecting outer end of the pin 12, adjacent to the valve-box 29. In this manner the pipe 26 is arranged to rock freely with the vessel 15 the same as the pipe 23. The end of the pipe 27 projecting into the valve-box 29 carries a cam or eccentric 31, which engages under a lever 32. This lever is fulcrumed within the box 29 at the point 33, and it is in connection with a cage 34, which carries a ball-valve 35. This valve, as shown in Figs. 2 and 5, seats on the upper end of a pipe 36, and said pipe has an enlarged portion 37, located in a case 38 below the box 29.

39 indicates a plug which screws in the bottom of the case 38 and presses the pipe 36 37 upward into place.

40 indicates the water-discharge pipe which passes from the case 38 and which communicates with the pipe 36 37 through an opening 41, formed in the enlarged part 37 of the pipe. When, therefore, the vessel 15 rocks down to the position shown by the dotted lines in Fig. 2, the eccentric 31 lifts the lever 32 and this in turn lifts the case 34 and ball-valve 35, thus uncovering the outlet from the trap and causing the steam-pressure in the chamber 17 to expel the water of condensation.

The organized operation of the trap may be traced as follows: Assuming the parts to be in the position shown in Fig. 2, the steam and water of condensation in passing the screen 23 will be relieved of foreign matter and will pass through the pipe 27 into the chamber 17. When the water accumulates in this chamber, so that its weight preponderates the weighted end 18 and such weights as may be placed in the chamber 19, the trap will cant to the position shown by dotted lines in Fig. 2. As the vessel 15 takes this movement the eccentric 31 will be rocked, and this will lift the outlet-valve 35 from its seat, so that the water in the chamber 17, pipe 27, and valve-box 29 may be expelled by the steam-pressure which pervades the top of the chamber. Upon the expulsion of the water, as described, the vessel 15 will by reason of its weighted end rock back to its normal position, and the above-described operation will be repeated. It will be observed that this operation goes on automatically as long as steam and water are supplied to the chamber 17.

Having thus described the preferred form of my invention, what I claim as new, and desire to secure by Letters Patent, is—

1. A steam-trap provided with a movably-mounted vessel adapted to receive the steam and water, a valve controlling the outlet from the trap, an operating member in connection with the valve, and an eccentric having connection with the vessel and engaging the operating member to operate the valve upon the movement of said vessel.

2. A steam-trap provided with a rockably-mounted vessel adapted to receive the steam and water, an eccentric having connection with the vessel to be rocked thereby, a valve controlling the outlet from the trap, and an operating member having connection with the valve and engaged by the eccentric.

3. A steam-trap having a rockably-mounted vessel adapted to receive the steam and water, an eccentric having connection with the trap and having its axis coincident to the axis of rotation of the vessel, a valve controlling the outlet from the trap, and an operating member having connection with the valve and engaged by the eccentric.

4. A steam-trap comprising a rockably-mounted vessel adapted to receive the steam and water, a filter-box communicating with the source of steam and water, a feed connection passing into the said vessel, said feed connection having a part loosely received in the filter-box and lying coincident to the axis of rotation of the vessel, a valve-box, a discharge connection passing from the vessel into the valve-box at a point coincident to the axis of rotation of the vessel, a discharge-valve within the valve-box, and a means in connection with said discharge-pipe for operating the valve.

5. A steam-trap comprising a vessel mounted to oscillate, said vessel having a steam and water chamber, and having at one end an open chamber adapted to receive a weight or weights, and means actuated by the oscillating movement of said vessel for controlling the steam and water movement in the trap.

6. A steam-trap provided with an oscillating vessel adapted to receive the steam and water, means controlling the outlet from the trap, and devices for operating said means, said devices including an eccentric having connection with the vessel to turn around the center of oscillation thereof.

7. A steam-trap provided with a movably-mounted vessel, a valve-box, a connection between the vessel and valve-box to discharge the water from the vessel into the valve-box, said box having a case, a water-discharge pipe passing from the case, an outlet-pipe having an enlarged portion located in the case and communicating with the discharge-pipe, the reduced portion of the outlet-pipe extending up into the valve-box, a ball-valve seated on the upper end of said outlet-pipe, and means actuated by the movement of the vessel for operating the ball-valve.

8. A steam-trap provided with a movably-mounted vessel, a valve-box, a connection between the vessel and valve-box to discharge the water from the vessel into the valve-box, said box having a case, a water-discharge pipe passing from the case, an outlet-pipe having an enlarged portion located in the case and communicating with the discharge-pipe, the reduced portion of the outlet-pipe extending up into the valve-box, a ball-valve seated on the upper end of said outlet-pipe, means actuated by the movement of the vessel for operating the ball-valve, said means comprising a gage engaging the ball, a lever in connection with the gage, and an eccentric engaging the lever and having connection with the vessel to move therewith.

9. A steam-trap provided with a movably-mounted vessel, a valve-box, a connection between the vessel and valve-box to discharge the water from the vessel into the valve-box, said box having a case, a water-discharge pipe passing from the case, an outlet-pipe having an enlarged portion located in the case and communicating with the discharge-pipe, the reduced portion of the outlet-pipe extending up into the valve-box, a ball-valve seated on the upper end of said outlet-pipe, and means actuated by the movement of the vessel for operating the ball-valve, said case having a removable plug or closure at its lower portion, and the outlet-pipe being removable through the lower end of the case.

10. A trap provided with a movably-mounted vessel, a valve-box, a connection between the vessel and valve-box to communicate the water from the vessel to the box, said valve-box having a case juxtaposed thereto, a discharge-pipe passing from the case, an outlet-pipe having two diameters, the larger portion of the outlet-pipe being located in the case and the smaller portion projecting into the valve-box, a valve seated on the small part of the outlet-pipe, and means actuated by the movement of the vessel for operating the valve.

11. A trap provided with a movably-mounted vessel, a valve-box, a connection between the vessel and valve-box to communicate the water from the vessel to the box, said valve-box having a case juxtaposed thereto, a discharge-pipe passing from the case, an outlet-pipe having two diameters, the larger portion of the outlet-pipe being located in the case and the smaller portion projecting into the valve-box, a valve seated on the small part of the outlet-pipe, and means actuated by the movement of the vessel for operating the valve, the case having a removable plug or closure in one side, and the said outlet-pipe being arranged to be withdrawn through said side of the case.

12. A steam-trap provided with a vessel adapted to receive the steam and water, a means for rockably mounting the same, a separate means for conducting the steam and water to and from the vessel, said means for conducting the steam and water comprising connections adapted to have relative turning movement, and located coincident to the axis of the rocking movement of the vessel, and means actuated by the rocking of the vessel for controlling the discharge from the trap.

In testimony whereof I have signed my name to this specification in the presence of two subscribing witnesses.

WILLIAM BLETSO.

Witnesses:
EMERY F. LYNN,
MAYBEL PETERS.